United States Patent
Lee

(10) Patent No.: US 8,209,468 B2
(45) Date of Patent: Jun. 26, 2012

(54) SEMICONDUCTOR MEMORY DEVICE AND WEAR LEVELING METHOD

(75) Inventor: Tae-Min Lee, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 502 days.

(21) Appl. No.: 12/351,076

(22) Filed: Jan. 9, 2009

(65) Prior Publication Data

US 2009/0182936 A1    Jul. 16, 2009

(30) Foreign Application Priority Data

Jan. 11, 2008  (KR) .................. 10-2008-0003547

(51) Int. Cl.
*G06F 13/00* (2006.01)
(52) U.S. Cl. .................. 711/103; 711/E12.008
(58) Field of Classification Search .............. 711/103
See application file for complete search history.

(56) References Cited

U.S. PATENT DOCUMENTS

| | | | |
|---|---|---|---|
| 7,797,481 B2 * | 9/2010 | Lee et al. ................ | 711/103 |
| 7,869,277 B1 * | 1/2011 | Cornwell et al. ........ | 365/185.11 |
| 2005/0091445 A1 * | 4/2005 | Chang et al. ............ | 711/103 |
| 2006/0004951 A1 * | 1/2006 | Rudelic et al. .......... | 711/103 |
| 2006/0106972 A1 * | 5/2006 | Gorobets et al. ........ | 711/103 |
| 2006/0161724 A1 * | 7/2006 | Bennett et al. .......... | 711/103 |
| 2007/0118688 A1 * | 5/2007 | Lee et al. ................ | 711/113 |
| 2007/0208904 A1 * | 9/2007 | Hsieh et al. ............. | 711/103 |
| 2007/0211532 A1 * | 9/2007 | Gonzalez et al. ........ | 365/185.11 |
| 2008/0313505 A1 * | 12/2008 | Lee et al. ................ | 714/47 |
| 2009/0157947 A1 * | 6/2009 | Lin et al. ................ | 711/103 |

FOREIGN PATENT DOCUMENTS

| | | |
|---|---|---|
| JP | 2003256289 A | 9/2003 |
| JP | 2007004234 A | 1/2007 |
| KR | 100297986 B1 | 5/2001 |
| KR | 1020050079991 A | 8/2005 |

* cited by examiner

*Primary Examiner* — Edward Dudek, Jr.
*Assistant Examiner* — Sean D Rossiter
(74) *Attorney, Agent, or Firm* — Volentine & Whitt, PLLC

(57) ABSTRACT

Disclosed is a semiconductor memory device and wear leveling method thereof. The semiconductor memory device including: a nonvolatile memory having pluralities of memory blocks, at least one of the memory blocks storing erasing counts of the memory blocks; and a memory controller managing wear leveling of the nonvolatile memory. The memory controller adjusts a period of managing the wear leveling with reference to the erasing counts.

11 Claims, 7 Drawing Sheets

Fig. 3

| LBN | PBN | E/C |
|-----|-----|-----|
| 101 | 101 | 45  |
| 102 | 102 | 461 |
| ... | ... | ... |
| 201 | 201 | 121 |
| 202 | 202 | 599 |
| ... | ... | ... |
| 999 | 999 | 342 |

(a)

| LBN | PBN | E/C |
|-----|-----|-----|
| 101 | 202 | 600 |
| 102 | 102 | 461 |
| ... | ... | ... |
| 201 | 201 | 121 |
| 202 | 101 | 46  |
| ... | ... | ... |
| 999 | 999 | 342 |

(b)

SEMICONDUCTOR MEMORY DEVICE AND WEAR LEVELING METHOD

CROSS-REFERENCE TO RELATED APPLICATIONS

This U.S. non-provisional patent application claims priority under 35 U.S.C. §119 to Korean Patent Application No. 10-2008-0003547 filed on Jan. 11, 2008, the subject matter of which is hereby incorporated by reference.

BACKGROUND

The present invention herein relates generally to semiconductor memory devices, and more particularly to a semiconductor memory device capable of executing a wear leveling method.

Semiconductor memory devices are used to store data, and may be generally categorized as volatile and nonvolatile in their operation. Data stored in a volatile memory device is lost when applied power is interrupted, while data stored in a nonvolatile memory device is retained even in the absence of applied power. As a result, nonvolatile memory devices are commonly employed in portable consumer electronics as mobile storage units.

Flash memory is a popular type of nonvolatile memory. Flash memory may be efficiently erased on a block-by-block basis before a programming operation, as compared with generic disk drive devices operating in an erase-before-program mode.

Since the data stored in flash memory cannot be directly updated, an erase operation is required before programming data. The required block-by-block erase operations inevitably "wear" (i.e., adversely effects the long term data storage capabilities of) the flash memory. Some form of wear leveling is required to ensure that certain memory blocks are not overly worn by repeated erase operations relative to other memory blocks.

The capacity of a particular flash memory device to withstand wear is referred to as "endurance". Endurance is often expressed as a maximum number of erase operation cycles that may be applied before adverse wear effects the normal operation of the memory. Endurance varies between different types of nonvolatile memory devices. For example, flash memory generally has an endurance property in the range of tens to hundred of thousands of erase operation cycles.

An active memory management scheme is required to manage wear across a plurality of available memory blocks in order level (e.g., operationally equalize) wear effects and maximize the useful life of the memory. However, conventional wear management routines result in significant additional overhead to the operation of a semiconductor memory device. Further, many conventional wear management routines operate without any direct relation to actual input/output (I/O) operations. Such routines may degrade memory performance and fail to adequately manage actual wear.

SUMMARY

The present invention is directed to solve the aforementioned problem, providing a semiconductor memory device and its wear leveling method capable of conducting flexible wear management in correspondence with a wear degree.

In one embodiment, the invention provides a semiconductor memory device including; a nonvolatile memory having a plurality of memory blocks, wherein the nonvolatile memory stores an erase count associated with at least one of the plurality of memory blocks, and a memory controller executing a wear leveling method in relation to the plurality of memory blocks, wherein the rate of execution for the wear leveling method varies in relation to the erase count.

In another embodiment, the invention provides a wear leveling method adapted for use in a semiconductor memory device having plurality of memory blocks, the method including; detecting an erase count associated with at least one of the plurality of memory blocks, determining a reference count in relation to the erase count, comparing a merge operation count with the reference count, and executing a wear leveling method in relation to the semiconductor memory in accordance with a result of the comparison.

BRIEF DESCRIPTION OF THE FIGURES

Non-limiting and non-exhaustive embodiments of the present invention will be described with reference to the following figures, wherein like reference numerals refer to like or similar elements throughout the figures, unless otherwise specified. In the figures:

FIG. 3, inclusive of FIGS. 3A and 3B, is a diagram conceptually illustrating the wear leveling management method of FIG. 2;

DETAILED DESCRIPTION OF EMBODIMENTS

Embodiments of the invention will now be described in some additional detail with reference to the accompanying drawings. The invention may, however, be embodied in many different forms and should not be constructed as being limited to only the embodiments set forth herein. Rather, these embodiments are presented as teaching examples.

In embodiments described hereafter, the "semiconductor memory device" described may be implemented as a phase-change random access memory (PRAM), a magnetic RAM, a ferroelectric RAM, and a charge tap flash (CTF) memory, a flash memory, etc.

In certain embodiments of the invention, a wear leveling method is executed (i.e., performed in relation to a competent semiconductor device by means of controller software, firmware, control logic hardware, or a combination of same) in relation to wear experienced by the semiconductor memory device. By less frequently executing the wear leveling method during periods of lesser wear, embodiments of the invention enhance the operating performance of the constituent semiconductor memory device. At the same time, by more frequently executing the wear leveling method during periods of greater wear, embodiments of the invention extend the operating life of the semiconductor memory device.

Figure 1:
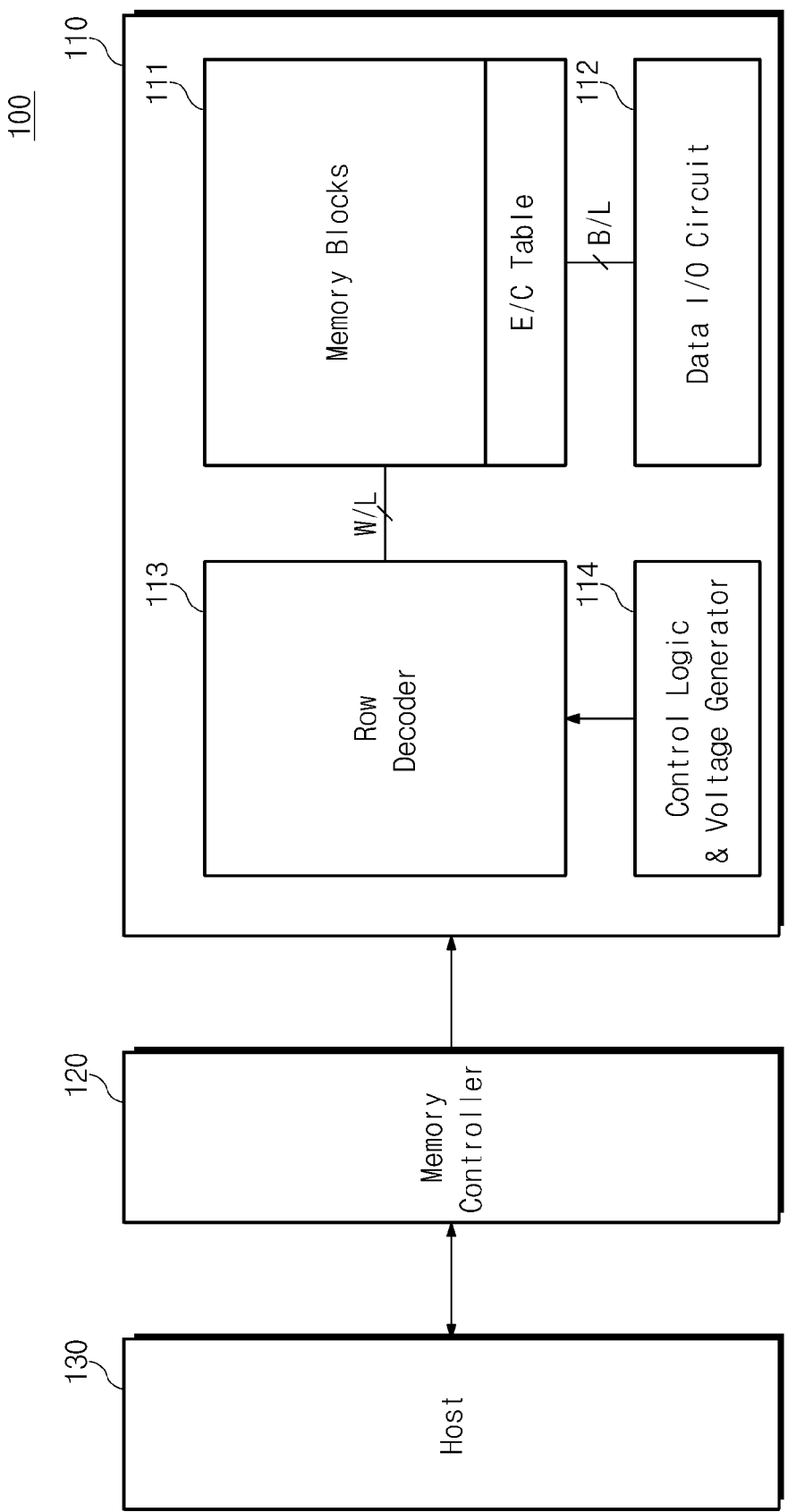
FIG. 1 is a block diagram of a semiconductor memory device according to an embodiment of the invention.

Figure (FIG.) 1 is a block diagram of a semiconductor memory device according to an embodiment of the invention. Referring to FIG. 1, a semiconductor memory device 100 generally comprises a flash memory 110, a memory controller 120, and a host 130. Flash memory 110 comprises a memory cell array 111, a data input/output (I/O) circuit 112, a row decoder 113, and various control logic $ voltage generator circuitry 114.

Memory cell array 111 is operatively divided into a plurality of memory blocks. Each memory block generally contains a plurality of memory pages. Although not shown, each page may be formed from a designed collection of memory cells within memory cell array 111. The memory cells are assumed to be conventional in their operation, but may be adapted to store single bit or multiple bit data. It is further assumed that flash memory 110 executes an erase operation on a block-by-block basis, while executing programming/read operations on a page-by-page basis. Memory cell array 111 may be further operationally divided to include a memory block area storing payload data (i.e., programmed data) and an administrative block area storing operational files and data, such as an erase operation count (E/C) table.

It is also assumed, consistent with conventional memory cell operating characteristics, that flash memory 110 is not capable of operating in a direct overwriting mode (i.e., that it is not able to partially update one or more memory page(s) in a defined memory block). In view of this programming inability, an updated page of data is stored in another ("new") memory block and the previously stored data of the "old" memory block is indicated as being no longer valid using conventionally understood data management schemes. One may understand from this process that, following many update operations, the aggregate size of invalid data areas within of the memory will become quite large and available "free" memory will decrease in size. As a result, it is necessary to execute an operation that transforms invalid data area(s) into an available data area(s) by erasing the data stored in the invalid data area(s). This type of data transforming operation is commonly referred to as a "merge operation".

An E/C table residing in the administrative data area of the semiconductor device stores a running count number for the erase operations (or erase cycles) applied to semiconductor memory device, hereinafter referred to as an "erase count" or E/C. For each erase operation applied to a particular memory block, the erase count for this memory block will increase by one. Bearing in mind that respective memory blocks will usually be erased in an uneven manner, it is necessary to provide a control method that levels the number of erase operations applied to each memory block in order to extend the useful life of the semiconductor memory device.

Data I/O circuit 112 is connected to memory cell array 111 via a plurality of bit lines B/L and receives data via data I/O (not shown). Input data (or data to be programmed) is ultimately stored in memory cell array 111. Output data (or data being read from memory) is read through data I/O circuit 112 and the bit lines B/L before passing to I/O lines.

Row decoder 113 is connected to memory cell array 111 via a plurality of word line W/L, and applies an address to select a memory block and/or page. Here, an address selecting a memory block is called a 'block address' and an address selecting a page is called a 'page address'.

Control logic $ voltage generator 114 operates to control the data I/O circuit 112 in response to command and control signals provided by memory controller 120. Control logic $ voltage generator 114 also generates certain voltages applied to the word lines W/L during programming and read operations. During a read operation, control logic $ voltage generator 114 operates to apply a read voltage to a selected word line and a deselect voltage to non-selected word lines. Generally, the deselect voltage will be higher than the read voltage.

Memory controller 120 operates to generally control flash memory 110 including the execution of a wear leveling method according to an embodiment of the invention. An exemplary wear leveling method adapted for execution by conventional memory controller 120 will be now described with reference to FIG. 2.

Figure 2:
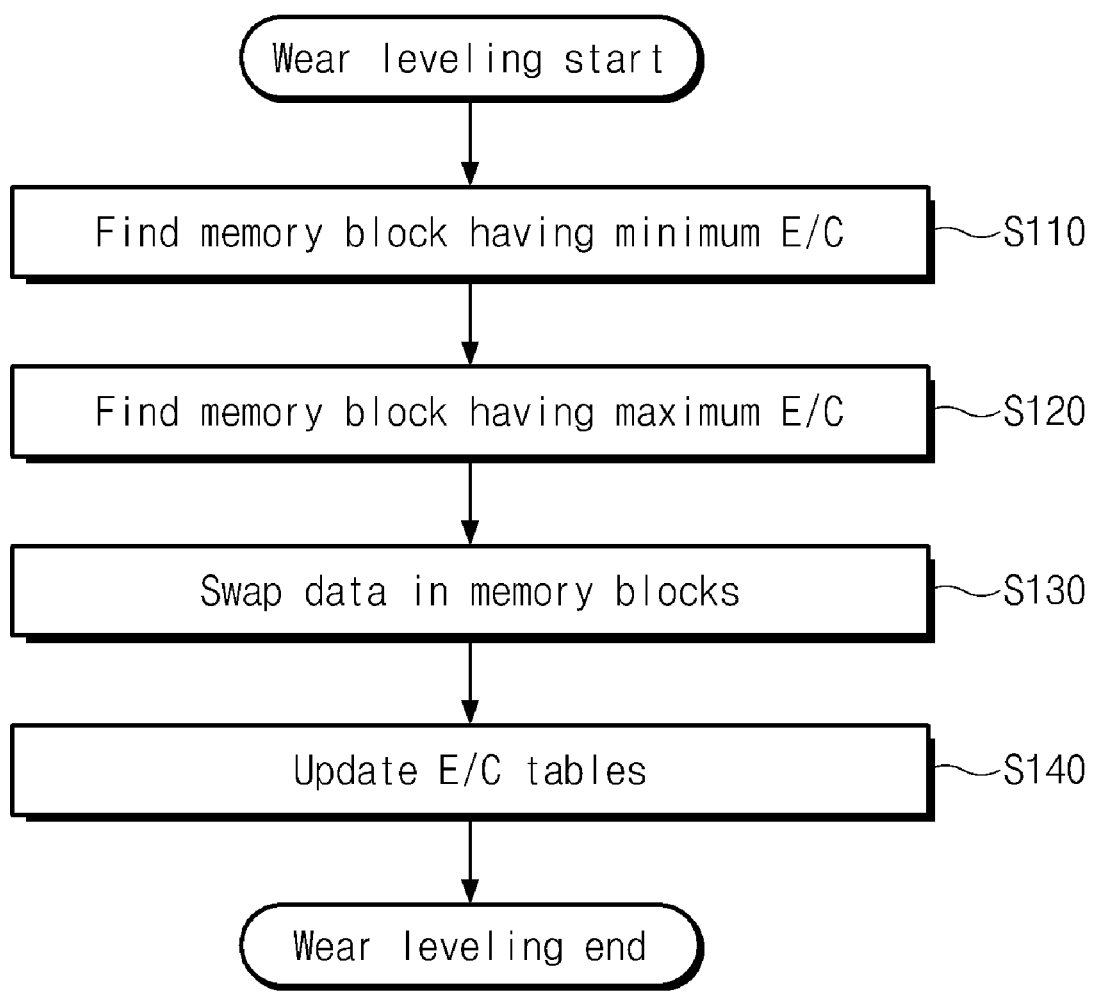
FIG. 2 is a flow chart summarizing a wear leveling management method according to an embodiment of the invention.

FIG. 2 is a flow chart summarizing a wear leveling method according to an embodiment of the invention. The wear leveling method is executed in such a manner as to ensure that various erase operations are equally applied across a plurality of available memory blocks. The method described in relation to FIG. 2 is merely one approach to accomplishing this result. The present invention is not to only this approach but extends across a range of control methods effectively leveling erase counts for a plurality of memory blocks. The working embodiment will be best understood upon consideration of a so-called execution point for the wear leveling method described hereafter.

Upon initiating the wear leveling method, memory controller 120 finds (e.g., identifies with reference to a current E/C table) a memory block having a lowest (or minimum) erase count (i.e., the "lowest memory block") (S110).

Next, memory controller 120 finds (e.g., again identifies with reference to the current E/C table) a memory block having a highest (or maximum) erase count (i.e., the "highest memory block") (S120).

Thereafter, memory controller 120 causes flash memory 110 to completely swap data between the lowest and highest memory blocks (S130).

Memory controller 120 now updates the current E/C table to generate an updated E/C table accurately reflecting the swap operation (S140). In this manner, the data from a most worn memory block (i.e., the highest memory block) is swapped for the data from a least worn memory block (i.e., the lowest memory block). By swapping the more frequently accessed (i.e., updated) data from the highest memory block with less frequently accessed data from the lowest memory block, the overall or aggregate endurance associated with the plurality of memory blocks forming memory array 111 is improved.

FIGS. 3A and 3B are diagrams conceptually illustrating the wear leveling method of FIG. 2. FIG. 3A shows a current E/C table before execution of the wear leveling method, while FIG. 3B shows an updated E/C table following execution of the wear leveling method.

Referring to FIG. 3A, the reference indicator "LBN" denotes the logical block numbers and the reference indicator "PBN" denotes the physical block numbers for each memory block. The physical block numbers PBN may be defined by sequentially allocating physical memory cells (i.e., data storage resources) for each one of a plurality of memory blocks operationally divided from a memory cell array. In contrast, the logical block numbers are conceptual references defined by a memory management protocol and associated with the divided physical memory blocks. There are many conventionally understood techniques for mapping logical block numbers onto physical block numbers including block mapping, page mapping, and log mapping, etc. Whatever mapping techniques is used, data assigned to a logically continuous address may be stored in relation to a completely different physical address.

With collective reference to FIGS. 1 through 3, memory controller 120 first refers to the current E/C table to identify a minimum erase count. As shown in FIG. 3A, the memory block having the logical block number 101 is identified as the lowest memory block with an erase count of 45. Next, memory controller 120 again refers to the current E/C table to identify a maximum erase count. As shown in FIG. 3A, the memory block having the logical block number 202 is identified as the highest memory block with an erase count of 599. Following these two memory block identifications, the data stored in the lowest and highest memory blocks are swapped.

After swapping data, the current E/C table is updated to form an updated E/C table. Further, referring to FIG. 3B, the memory block having the logical block number 101 now corresponds to the physical block number 202, and the memory block having the logical block number 202 now corresponds to the physical block number 101. Note that the updated E/C table has been incremented from each of these memory blocks. By swapping more frequently accessed data from a more worn memory block with less frequently accessed data from a less worn memory block, the relative wear between more worn and less worn memory block may be effectively leveled to preserve the maximum endurance for a constituent memory cell array.

This type of wear level balancing may continue until the plurality of memory blocks exhibit a specific wear condition (hereafter referred to as implicating an "execution point"), such as an erase count triggering a merge operation. However, an erase count is only one type of indicator (or wear factor) that may be associated with a merge operation triggering point. For instance, the wear leveling may be executed by taking into account such characteristics as the size, correction frequency, etc., of programmed data.

Figure 4:
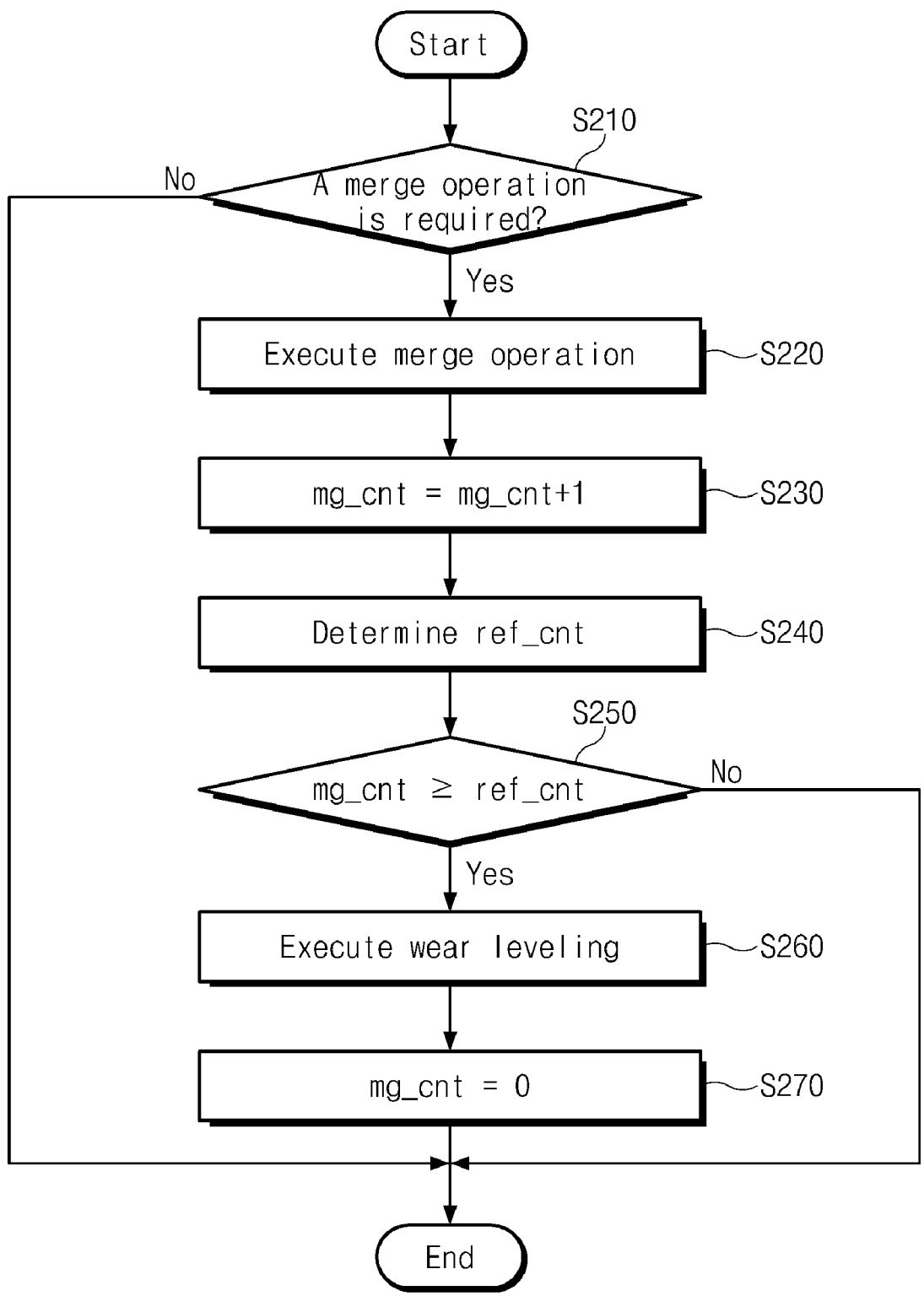
FIG. 4 is a flow chart further illustrating an execution point within a wear leveling management method according to an embodiment of the invention.

FIG. 4 is a flow chart further illustrating an execution point for a wear leveling method according to an embodiment of the invention.

First, memory controller 120 determines whether a merge operation is required (i.e., that a merge operation triggering condition is detected) (S210). As noted above, a merge operation may be triggered for various reasons. For example, a merge operation may be needed if there are no available memory blocks in a memory cell array.

Upon determining that a merge operation is required, memory controller 120 causes flash memory 110 to execute a merge operation (S220). Flash memory 110 executes the merge operation in response to a command provided by memory controller 120. Using one of several conventionally understood techniques, the merge operation erases invalid data from one or more memory blocks.

Following execution of the merge operation, memory controller 120 increments a merge operation count (mg_cnt) (S230). The merge operation count may be stored in a register or table in memory controller 120 or in the administrative block area of flash memory 110. As will be described later, the merge operation count acts as a reference related to a determination of wear leveling method execution.

Next, memory controller 120 determines a reference count (ref_cnt) derived from the erase counts associates with memory blocks. Assuming a plurality of memory blocks, the reference count may be derived from a current maximum erase count, an average erase count, or similar metric. In relation to the embodiment of FIG. 4, it is assumed that the reference count is determined in relation to a current maximum erase count. An example of reference count determination is described in relation to FIG. 5.

Returning to the method summarized in FIG. 4, memory controller 120 next determines whether the merge operation count has reached the reference count (S250). So long as the merge operation count is less than the reference count, the wear leveling method does not begin. However, once the merge operation count equals or exceeds the reference count (S250=yes), execution of the wear leveling method begins (S260). The wear leveling method may be executed in a manner similar to that described in relation to FIG. 2. After execution of the wear leveling method, the merge operation count is reset to 0 (S270).

Using the aforementioned method, an execution point for a wear leveling method may be determined in accordance with an embodiment of the invention.

In certain embodiments of the invention, the reference count may vary in accordance with a degree of wear occurring within a semiconductor memory device. Thus, it is permissible to manage the endurance of a semiconductor memory device by considering a degree of wear. For instance, at a relatively early point in time associated with a relatively low degree of wear, the semiconductor memory device is able to enhance its performance by reducing the frequency with which a leveling method is applied. In contrast, at a relatively late point in time associated with a high degree of wear, the useful life of a semiconductor memory device may be extended by a more frequent application of a wear leveling method.

Thus, the reference count may be determined in a variety of ways to dynamically account for the actual states of the semiconductor memory device. For example, the reference count may be determined in relation to the erase count for a particular memory block. If the erase count for the memory block is relatively small, the reference count may be increased, and a competent wear leveling method applied at a rate. In this case, the semiconductor memory device is assumed to be free from performance degradations due to excessive wear. In contrast, if the erase count for the memory block is relatively large, the reference count may be decreased to apply a wear leveling method at a higher rate. In this case, the lifetime of the semiconductor memory device may be lengthened despite well worn memory blocks.

Table 1 below shows some exemplary values for a reference count in accordance with various erase counts (E/C) for a memory block of a typical contemporary flash memory device.

TABLE 1

| Memory block E/C | Ref_cnt |
|---|---|
| $\leq 500$ | 25 |
| $\leq 750$ | 20 |
| $\leq 875$ | 15 |
| $\leq 930$ | 10 |
| $>900$ | 5 |

Referring to Table 1, when the memory block E/C is less than 500, the reference count is set to 25. This means that the wear leveling method is executed every $25^{th}$ merge operation. On the other hand, when the memory block E/C is greater than 900, the reference count is set to 5. This means that the wear leveling method is activated every $5^{th}$ merge operation.

Thus, the wear leveling method is executed in relation to an erase count (or a plurality of erase counts) associated with one or more memory blocks. In a sense, the application of a wear leveling method is weighted to yield either improved performance of the semiconductor memory device early on or extended lifetime for the semiconductor memory device later on.

Figure 5:
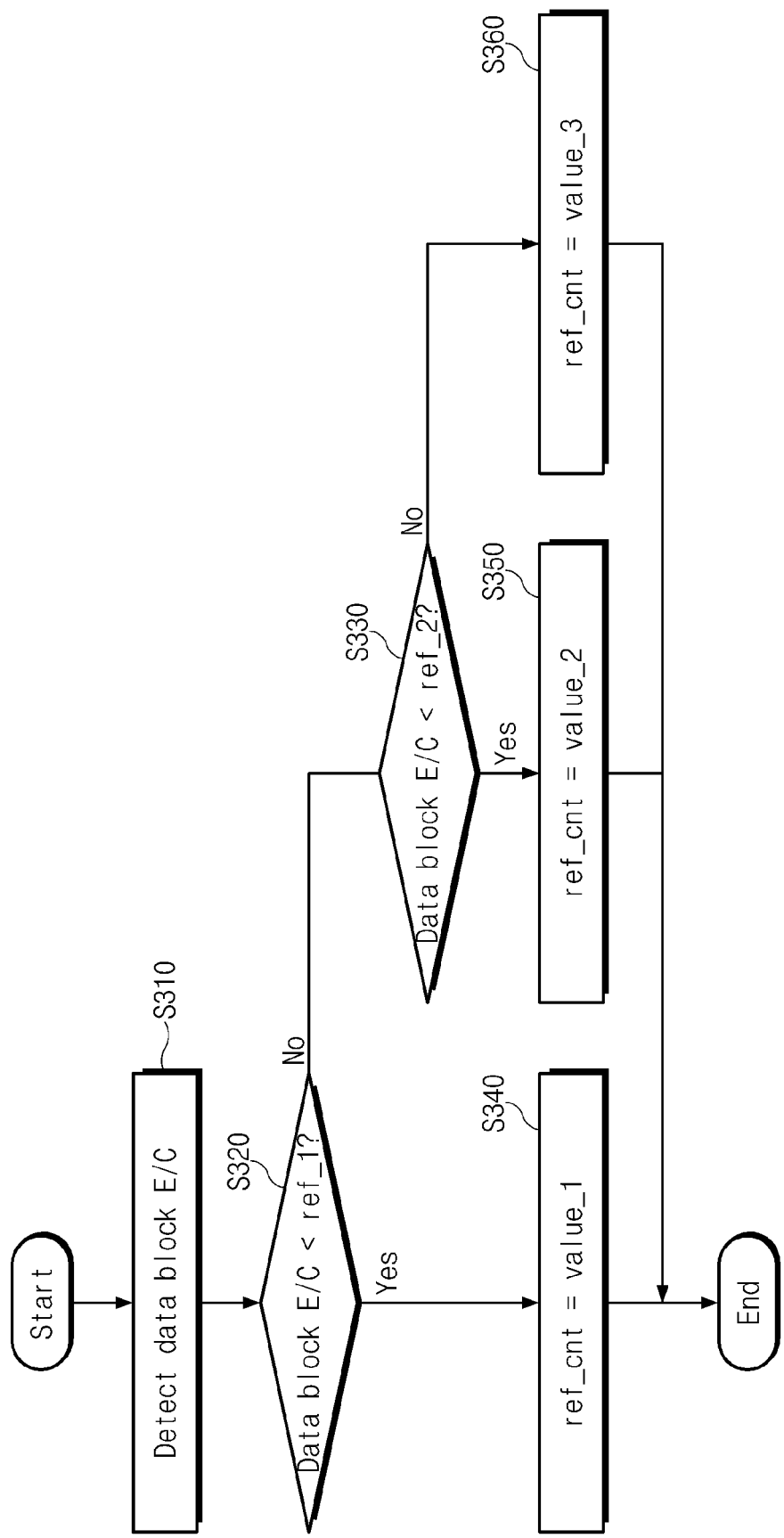
FIG. 5 is a flow chart further illustrating a procedure for determining a reference count within a wear leveling management method according to an embodiment of the invention.

FIG. 5 is a flow chart summarizing one exemplary method for determining a reference count triggering a wear leveling method in accordance with an embodiment of the invention. Referring to FIG. 5, the exemplary method for determining a reference count comprises detecting a current erase count E/C (S310), comparing the current erase count to first and second reference counts (S320 and S330), and setting the reference count (S340, S350, and S360) in relation to the comparisons.

First, memory controller 120 detects a current erase count for one or more memory block(s) (e.g.,) with reference to an E/C table. The current erase count is then used to determine a reference count (S310).

Memory controller 120 then determines whether the current erase count has reached a first reference value (ref_1) (S320). So long as the current erase count remains less than the first reference value, the reference count is defined as a first reference value (value_1) (S340).

However, once the current erase count equals or exceeds the first reference value, the current erase count is then compared to a second reference value (ref_2) (S330). If the erase count equals or exceeds the first reference value but remains less than the second reference value, then the reference count is defined as a second reference value (value_2) (S350).

However, once the current erase count equals or exceeds the second reference value, the reference count is defined as a third reference value (value_3) (S360).

The selection of the first through third reference values is a matter of design choice. Thus, embodiments of the invention are able to set reference count in relation to a particular degree of expected wear for one or more memory blocks.

Figure 6:
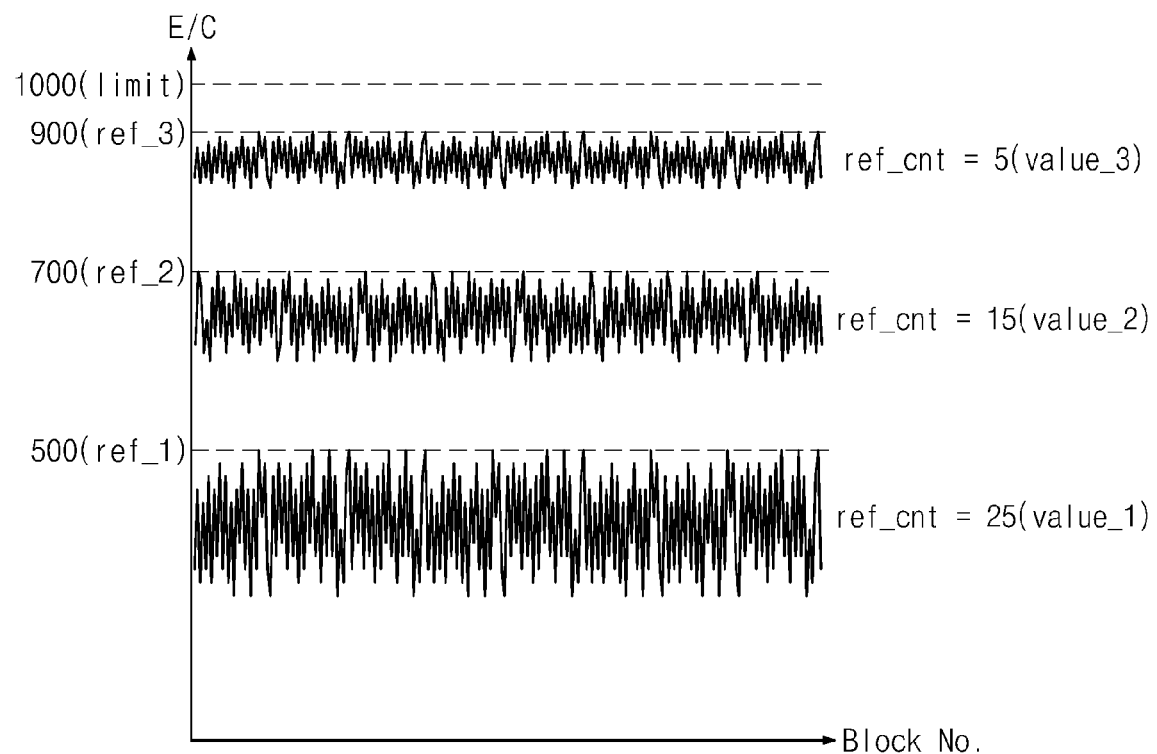
FIG. 6 is a graphic plot diagram showing variations in endurance induced by the use of a wear leveling management method according to an embodiment of the invention.

FIG. 6 is a graphic plot showing variations in endurance as a function of erase count using a wear leveling method according to an embodiment of the invention. Referring to FIG. 6, the horizontal axis denotes the logical block numbers and the vertical axis denotes the erasing counts (E/C). In this embodiment, it is assumed that the limit of the erase count is 1000 (i.e., the available number of erase cycle may not be more than 1000). It is further assumed that the first through third reference values are 500, 700, and 900 respectively. Further, it is assumed that the first through third values are 25, 15, and 5 respectively.

Referring to FIG. 6, once the erase count for the memory block(s) reaches 500, the reference count is set to 25. Thus, the wear leveling method is executed once every $25^{th}$ merge operation. As the wear leveling method is executed at a lower rate, the semiconductor memory device exhibits improved performance characteristics.

Once the erase count reaches 900, the reference count is set to 5. Thus, the wear leveling method is executed every $5^{th}$ merge operation. As the wear leveling method is now applied at a much higher rate, the wear on the semiconductor memory device is more frequently adjusted across the plurality of memory blocks. As a result, the useful life of the semiconductor memory is extended.

Figure 7:
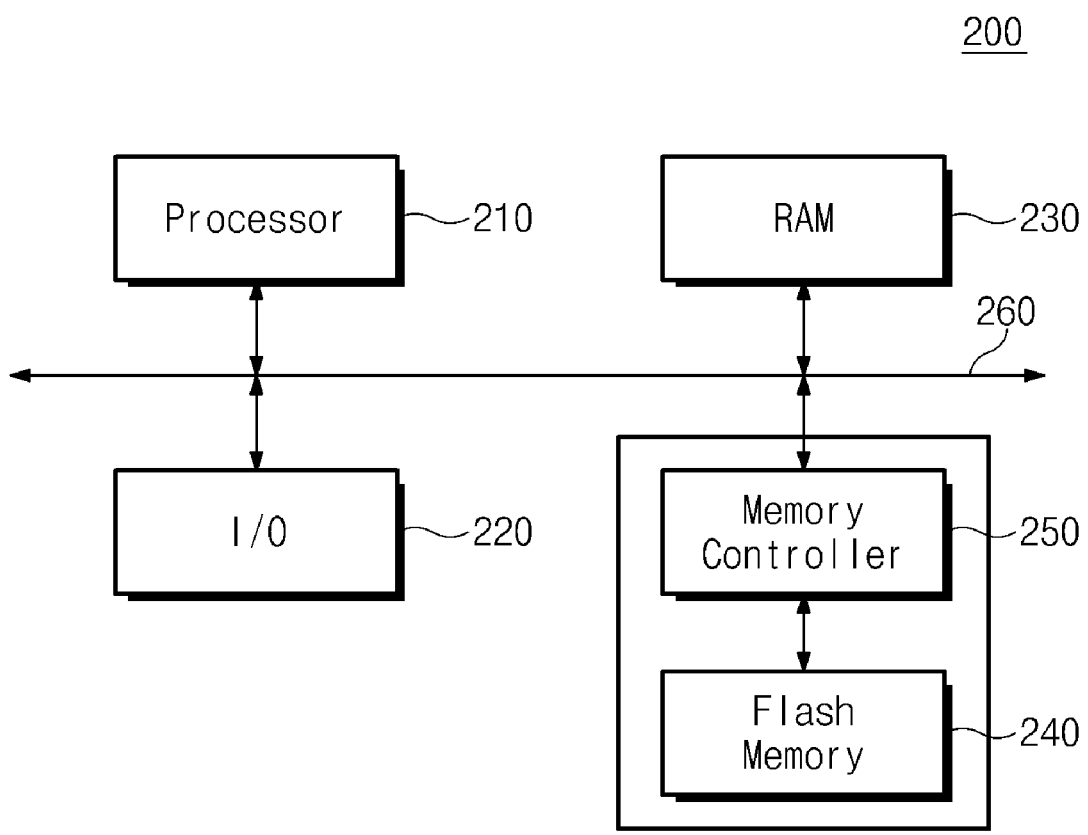
FIG. 7 is a block diagram schematically showing a computational logic system incorporating a semiconductor memory device according to an embodiment of the invention.

FIG. 7 is a block diagram schematically showing a computing system 200 with a semiconductor memory device according to the present invention. The computing system 200 may be a digital camera, a video camera, a cellular communication device, a portable calculator, an audio player, a video player, or an MP3 player. Otherwise, the computing system 200 may be a system for simply recording and searching data.

Referring to FIG. 7, the computing system 200 is comprised of a processor 210, an input/output unit (I/O) 220 exchanging data with an external system, a RAM 230, a flash memory 240 retaining data, which are provided from the external system, in nonvolatility, a memory controller 250 for controlling a series of operations such as reading, writing, and updating data files, and a system bus 260 for permitting those components to communicate with each other. Although not shown, the computing system 200 may be further comprised of display units and network devices.

The processor 210, if an external request for working data files (e.g., writing or updating) is input through the input/output unit 220, allocates a part of the RAM 230 to a working space. Into the working space allocated to the RAM 230, data are repeatedly read from the flash memory 240. And data files are corrected in the working space of the RAM 230. Here, the data file contains management information relevant to practical data, such as practical contents, a practical file size, an updating point, logical address information, and so on. After correcting the data file, the corrected data file is recorded into the flash memory 240.

The memory controller 250 analyzes a data file, which is output from the flash memory 240, in compliance with a control command of the processor 210. The memory controller 250 also manages and controls a data file input/output to/from the flash memory 240, e.g., storing and erasing the data file that is input to the flash memory 240. In detail, the memory controller 250 is programmed in software to avoid frequent erasing and writing operations of data files on a specific area, which reduce a lifetime of the flash memory 240. This software programming is widely known as 'wear leveling technique'.

The computing system 200 according to the present invention is also applicable to a solid state disk (SSD). In recent years, SSD products are being spotlighted in new generation memory markets as competitive solutions suitable for replacing hard disk drives (HDDs) therewith. SSDs are more advantageous than HDDs, which operate mechanically, in operation rate, external impact, and power consumption.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A semiconductor memory device comprising:
   a nonvolatile memory having a plurality of memory blocks, wherein the nonvolatile memory stores an erase count associated with at least one of the plurality of memory blocks and a merge operation count associated with the at least one of the plurality of memory blocks; and
   a memory controller executing a wear leveling method in relation to the plurality of memory blocks, wherein the wear leveling method is executed each time the merge operation count reaches a reference count, and wherein the reference count decreases with an increase in the erase count.

2. The semiconductor memory device of claim 1, wherein the erase count is derived in relation to more than one of the plurality of memory blocks.

3. The semiconductor memory device of claim 2, wherein the memory controller causes a data swap between a highest memory block having a highest current erase count and a lowest memory block having a lowest current erase count.

4. The semiconductor memory device of claim 1, wherein the memory controller determines the reference count from the erase count according to a predefined relationship in which the reference count decreases with an increase in the erase count.

5. The semiconductor memory device of claim 4, wherein the memory controller executes the wear leveling method in response to a number of merge operations executed in the nonvolatile memory.

6. The semiconductor memory device of claim 1, wherein the nonvolatile memory comprises:
- a memory cell array including the plurality of memory blocks;
- a data input/output circuit connected to the memory cell array through a plurality of bit lines to sense data stored in the memory cell array;
- a row decoder connected to the memory cell array through a plurality of word lines to select one of the plurality of memory blocks in response to an address; and
- a control logic circuit controlling the data input/output circuit and the row decoder in response to a command provided from the memory controller.

7. The semiconductor memory device of claim 6, wherein the control logic circuit zeros the erase count in response to a command provided from the memory controller.

8. A wear leveling method adapted for use in a semiconductor memory device having plurality of memory blocks, the method comprising:
- detecting an erase count associated with at least one of the plurality of memory blocks;
- determining a reference count from the erase count according to a predefined relationship in which the reference count decreases with an increase in the erase count;
- detecting a merge operation count associated with the at least one of the plurality of memory blocks;
- comparing the merge operation count with the reference count; and
- executing a wear leveling method in relation to the semiconductor memory in accordance with a result of the comparison.

9. The method of claim 8, further comprising:
- increasing the merge operation count upon each execution of a merge operation between two or more of the plurality of memory blocks, wherein the wear leveling method is executed when the merge operation count reaches the reference count.

10. The method of claim 8, wherein determining the reference count comprises:
- detecting whether the erase count has reached a reference value; and thereafter,
- determining the reference count in accordance with the predefined relationship.

11. A wear leveling method adapted for use in a semiconductor memory device having plurality of memory blocks, the method comprising:
- detecting an erase count associated with at least one of the plurality of memory blocks;
- determining a reference count in relation to the erase count;
- comparing a merge operation count with the reference count; and
- executing a wear leveling method in relation to the semiconductor memory in accordance with a result of the comparison, wherein a rate of execution for the wear leveling method is increased with an increase in the erase count; and
- increasing the merge operation count upon execution of a merge operation between two or more of the plurality of memory blocks, wherein the wear leveling method is executed once the merge operation count reaches the reference count, and the reference count is reduced in accordance with an increase of the erase count.

* * * * *